US008719628B2

(12) United States Patent
Sasagawa

(10) Patent No.: US 8,719,628 B2
(45) Date of Patent: May 6, 2014

(54) MULTI-CORE SYSTEM, METHOD OF CONTROLLING MULTI-CORE SYSTEM, AND MULTIPROCESSOR

(75) Inventor: Kentaro Sasagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 194 days.

(21) Appl. No.: 13/386,560

(22) PCT Filed: Apr. 2, 2010

(86) PCT No.: PCT/JP2010/002455
§ 371 (c)(1),
(2), (4) Date: Jan. 23, 2012

(87) PCT Pub. No.: WO2011/021318
PCT Pub. Date: Feb. 24, 2011

(65) Prior Publication Data
US 2012/0137163 A1 May 31, 2012

(30) Foreign Application Priority Data
Aug. 19, 2009 (JP) .................................. 2009-190103

(51) Int. Cl.
G06F 11/00 (2006.01)

(52) U.S. Cl.
USPC .......................................... 714/13; 714/5.11

(58) Field of Classification Search
USPC ....................... 714/5.1, 5.11, 10–13
See application file for complete search history.

(56) References Cited

U.S. PATENT DOCUMENTS

| 5,383,192 A | 1/1995 | Alexander | |
|---|---|---|---|
| 7,243,266 B2 * | 7/2007 | Hiramatsu et al. | 714/37 |
| 7,673,174 B2 * | 3/2010 | Swift et al. | 714/15 |
| 2004/0153584 A1 * | 8/2004 | Koishi | 710/33 |
| 2005/0246581 A1 * | 11/2005 | Jardine et al. | 714/12 |

FOREIGN PATENT DOCUMENTS

| CN | 1149735 A | 5/1997 |
|---|---|---|
| JP | 2-289020 A | 11/1990 |
| JP | 4-219860 A | 8/1992 |
| JP | 9-233466 A | 9/1997 |
| JP | 11-194996 A | 7/1999 |
| JP | 2005115751 A | 4/2005 |
| JP | 2007219757 A | 8/2007 |
| JP | 2008117517 A | 5/2008 |
| JP | 2008106173 A | 8/2008 |

OTHER PUBLICATIONS

International Search Report for PCT/JP2010/002455 mailed Jun. 22, 2010.
Japanese Office Action for JP2009-190103 mailed on Jul. 10, 2012.
Chinese Office Action with Search Report for CN Application No. 201080034219.3 issued on Dec. 16, 2013 with Partial English Translation.

* cited by examiner

Primary Examiner — Philip Guyton
(74) Attorney, Agent, or Firm — Sughrue Mion, PLLC

(57) ABSTRACT

A multi-core system 1 according to the present invention includes a plurality of OSs: OS[1] 110 and OS[2] 120 set as a main system and a standby system for a sound reproducing function. The standby-system OS[1] 110 sets a timer 17 according to a DMA transfer completion interruption request to detect a failure of the main-system OS[2] 120 according to detection of timeout by the timer 17. Upon detection of a failure of the main-system OS[2] 120, the standby-system OS[1] 110 is switched as the main-system OS[2] 120 to operate a device driver 114 on a side of the standby-system OS[1] 110, thereby continuously executing audio mixing processing of audio data and DMA transfer request processing.

10 Claims, 12 Drawing Sheets

MULTI-CORE SYSTEM, METHOD OF CONTROLLING MULTI-CORE SYSTEM, AND MULTIPROCESSOR

TECHNICAL FIELD

The present invention relates to a multi-core system, a method of controlling a multi-core system, and a multiprocessor.

BACKGROUND ART

Processors (MPUs: Micro Processing Units) for built-in use employing a multi-core system embedded with a plurality of central processing unit (CPU) cores have been developed. These processors are mounted in one chip with peripheral devices included therein.

A technique of operating a plurality of different operating systems (OSs) on a multi-core CPU is known. Further, means for notifying a single interrupt request (IRQ) to a plurality of CPU cores is known as a function of the MPU. Further, the MPU can set to which CPU core the interrupt request should be allocated based on a register setting.

Another technique shown in FIG. 9 is known, for example, for transferring audio data (e.g., pulse code modulation (PCM) sound) from a CPU inside an MPU 50 to an audio DAC (ADAC) 51 through an Inter-IC Sound (I2S) bus. The I2S is a serial communication format made by PHILIPS (registered trademark) and forming an interface device of audio data. According to the I2S specification, PCM sound or compressed sound (μ-law, ADPCM or the like) can be transmitted to the ADAC 51 through the I2S bus. Further, in FIG. 9, an Inter-Integrated Circuit (I2C) bus is a serial bus for controlling devices developed by PHILIPS (registered trademark). The ADAC 51 converts the audio data into stereo sound. The DAC is a D/A converter. The analog sound (stereo) output from the ADAC 51 is reproduced in a speaker 59.

Further, as shown in FIG. 10, for example, a sound server 56 is known that receives audio data output from a plurality of OSs through a network, mixes the plurality of pieces of audio data that are received with audio data received in the same client PC, and converts the data into a single stereo sound. In the example shown in FIG. 10, audio data output from application programs [A] and [B] (abbreviated as application [A] 53 and application [B] 54) of a UNIX (registered trademark) server 52 is transmitted to a client PC 55 using a TCP/IP. The sound server 56 of the client PC 55 mixes the audio data transmitted from a UNIX server 52 and the audio data output from an application program [C] (abbreviated as application [C] 57 in FIG. 10) to output the mixed data to a sound driver 58. In UNIX (registered trademark), for example, well-known Esound and Pulse Audio may be used as the sound server 56.

Other techniques related to the present invention include the ones disclosed in Patent literatures 1 to 3. For example, a host monitoring control system by a multi-system control processor disclosed in Patent literature 1 determines occurrence of a failure in a host according to detection of timeout of a monitoring timer installed for each host. Upon determination that the recovery is required, the host specified as a first recovery starts a recovery process. In this way, the failure in the host is promptly detected without intervention by an operator, thereby uniquely determining the recovery host that performs the rest of the processing.

CITATION LIST

Patent Literature

[Patent Literature 1]
Japanese Unexamined Patent Application Publication No. 4-219860
[Patent Literature 2]
Japanese Unexamined Patent Application Publication No. 2005-115751
[Patent Literature 3]
Japanese Unexamined Patent Application Publication No. 2-289020

SUMMARY OF INVENTION

Technical Problem

However, in a configuration in which a plurality of OSs are operated on a single multi-core CPU and a single I2S device embedded in an MPU is shared by the plurality of OSs, when an exception (kernel panic) occurs in one OS or an OS freezes (OS stops or does not work appropriately, and cannot receive any input from an input apparatus), sound reproduction from the other OS stops. The reason for that will be noted below.

When the I2S device is shared by the plurality of OSs, only one OS which is the owner among the plurality of OSs can control the device. Therefore, Direct Memory Access (DMA) transfer of audio data stops because of the panic or freeze occurred in one OS.

Further, in the I2S device that is used for sound reproduction, when reception of audio data is interrupted (which means when the DMA transfer is stopped) for a predetermined period of time (several hundreds of μs to several ins) after completion of the previous DMA transfer of the audio data, it is determined as an underrun error, which occurs sound interruption. Accordingly, the next DMA transfer needs to be started within a predetermined period of time after the occurrence of interruption upon completion of the DMA transfer.

Further, the operations of the sound driver and the sound server stop because of the occurrence of an exception or freeze in an OS.

A technique as shown in FIG. 11 is known, for example, to deal with the problem that the sound reproduction stops due to the occurrence of exception or freeze in the OS. The technique shown in FIG. 11 addresses the problem stated above by allocating a dedicated I2S device for each OS mounted on a built-in MPU 60 and adding an external mixing mechanism using a digital signal processor (DSP) 61 and the like. In FIG. 11, an I2S_1 is allocated to an OS[1] 63, and an I2S_2 is allocated to an OS[2] 64. A sound driver 65 supplies audio data output from an application program [1] (abbreviated as application [1] 66 in FIG. 11) of the OS[1] to the DSP 61 through the I2S_1. Further, a sound driver 67 supplies audio data output from an application program [2] (abbreviated as application [2] 68 in FIG. 11) of the OS[2] 64 to the DSP 61 through the I2S_2. The DSP 61 then performs audio mixing processing on the audio data received through the I2S_1 and the I2S_2 to supply analog sound to an AUDIO, AMP 62.

However, a plurality of I2S devices are not necessarily mounted in the MPU as shown in FIG. 11. Further, addition of an external mixing mechanism leads to an increase in the number of elements, which increases cost and prevents reduction in the circuit size. As a result, the technique shown in FIG. 11 cannot solve the problem in the area of the embedding technique.

Accordingly, one exemplary object of the present invention is to provide a multi-core system, a method of controlling a multi-core system, and a multiprocessor that are capable of preventing occurrence of sound interruption with a simple configuration.

Solution to Problem

A multi-core system according to the present invention includes a plurality of operating systems set as a main system and a standby system for a sound reproducing function, including: a plurality of processors for operating the plurality of operating systems; a shared memory shared by the plurality of operating systems; a peripheral device shared by the plurality of operating systems and receiving audio data stored in the shared memory, the audio data being transferred by DMA; a device driver of the main system included in the operating system of the main system or operating on the operating system of the main system; a driver management unit included in the operating system of the standby system or operating on the operating system of the standby system; and a device driver of the standby system included in the operating system of the standby system or operating on the operating system of the standby system, the device driver being managed by the driver management unit, in which the driver management unit sets a timer according to a DMA transfer completion interruption request to detect a failure of the operating system of the main system according to detection of timeout by the timer, and upon detection of the failure of the operating system of the main system, the driver management unit switches the operating system of the standby system as the operating system of the main system, operates the device driver of the standby system, to continuously execute audio mixing processing of audio data and DMA transfer request processing.

Further, a method of controlling a multi-core system according to the present invention includes a plurality of processors, a plurality of operating systems operated on the plurality of processors, a shared memory shared by the plurality of operating systems, and a peripheral device shared by the plurality of operating systems and receiving audio data stored in the shared memory, the audio data being transferred by DMA, the plurality of operating systems being set as a main system and a standby system for a sound reproducing function, in which: a driver management unit included in the operating system of the standby system or operating on the operating system of the standby system sets a timer according to a DMA transfer completion interruption request to detect a failure in the operating system of the main system according to detection of timeout by the timer, upon detection of the failure in the operating system of the main system, switches the operating system of the standby system as the operating system of the main system, and operates a device driver of the standby system managed by the driver management unit, the device driver being included in the operating system of the standby system or operating on the operating system of the standby system, thereby continuously executing audio mixing processing of audio data and DMA transfer request processing Furthermore, a multiprocessor according to the present invention includes a plurality of processors, a plurality of operating systems operated on the plurality of processors; and a DMA controller for controlling DMA transfer of audio data stored in an external shared memory from the external shared memory shared by the plurality of operating systems to a peripheral device, the plurality of operating systems being set as a main system and a standby system for a sound reproducing function, the multiprocessor further including: a driver management unit included in the operating system of the standby system or operating on the operating system of the standby system; and a device driver of the standby system included in the operating system of the standby system or operating on the operating system of the standby system, the device driver being managed by the driver management unit, in which the driver management unit sets a timer according to a DMA transfer completion interruption request to detect a failure of the operating system of the main system according to detection of timeout by the timer, and upon detection of the failure of the operating system of the main system, the driver management unit switches the operating system of the standby system as the operating system of the main system, operates the device driver of the standby system, to continuously execute audio mixing processing of audio data and DMA transfer request processing.

Advantageous Effects of Invention

The present invention is able to provide a multi-core system, a method of controlling a multi-core system, and a multiprocessor that are capable of preventing occurrence of sound interruption with a simple configuration.

DESCRIPTION OF EMBODIMENTS

First, with reference to FIG. 12, a principle of the present invention will be described.

Figure 12:
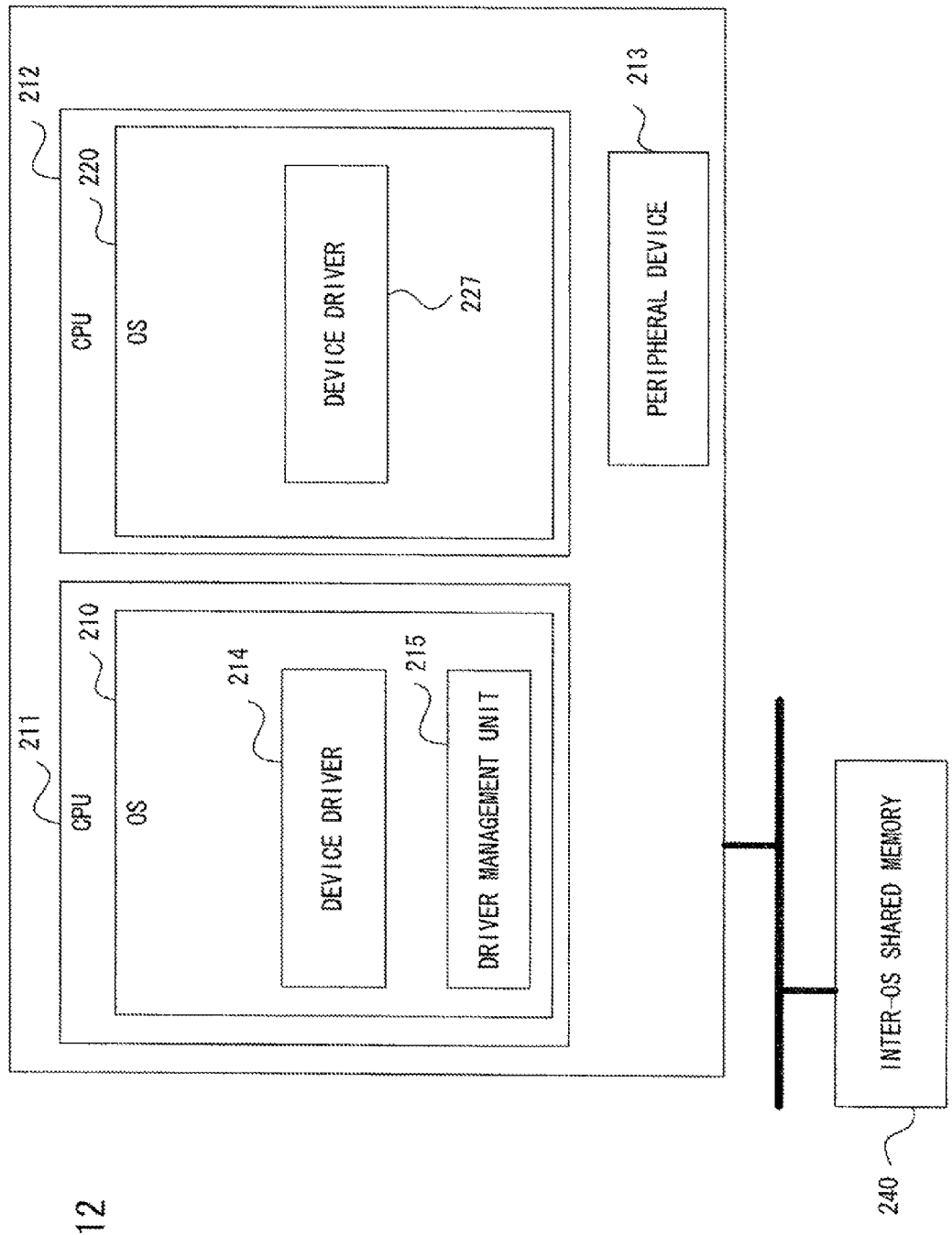
FIG. 12 is a diagram for describing a principle of the present invention.

As shown in FIG. 12, a multi-core system according to the present invention is a multi-core system in which a plurality of operating systems (210, 220) are set as a main system and a standby system according to a sound reproducing function. The multi-core system includes a plurality of processors (211, 212) that operate the plurality of operating systems (210, 220) respectively, a shared memory (240) shared by the plurality of operating systems (210, 220), and a peripheral device (213) which is shared by the plurality of operating systems (210, 220) and receives audio data stored in the shared memory (240) transferred through DMA. Further, the multi-core system includes a device driver (227) of the main system that is included in the operation system (220) of the main system or operates on the operating system (220) of the main system, a driver management unit (215) that is included in the operating system (210) of the standby system or operates on the operating system (210) of the standby system, and a device driver (214) of the standby system that is included in the operating system (210) of the standby system or operates on the operating system (210) of the standby system, the device driver being managed by the driver management unit (215). When the driver management unit (215) sets a timer according to a DMA transfer completion interrupt request, detects a failure in the operating system (220) of the main system according to the detection of timeout in the timer, and detects a failure in the operating system (220) of the main system, the operating system (210) of the standby system is switched to the operating system of the main system and the device driver (214) of the standby system is operated, thereby capable of continuously executing audio mixing processing of audio data and DMA transfer request processing.

The multi-core system according to the present invention is a system that operates a plurality of OSs on a single multi-core CPU, and shares a single I2S device among the plurality of OSs. The multi-core system is capable of preventing occurrence of sound interruption in the output sound from one of the OSs that normally operates even when a failure occurs in the other OS and the OS freezes.

The multi-core system according to the present invention aims to meet a deadline of a timing to transmit audio data to the I2S device to prevent occurrence of noise or sound interruption at the time of the DMA transfer even when an OS freezes in a middle of audio mixing processing, as will be described below. The audio mixing processing here means processing for mixing audio data from the plurality of application programs operated on each OS to generate a single sound.

First Exemplary Embodiment

Figure 1:
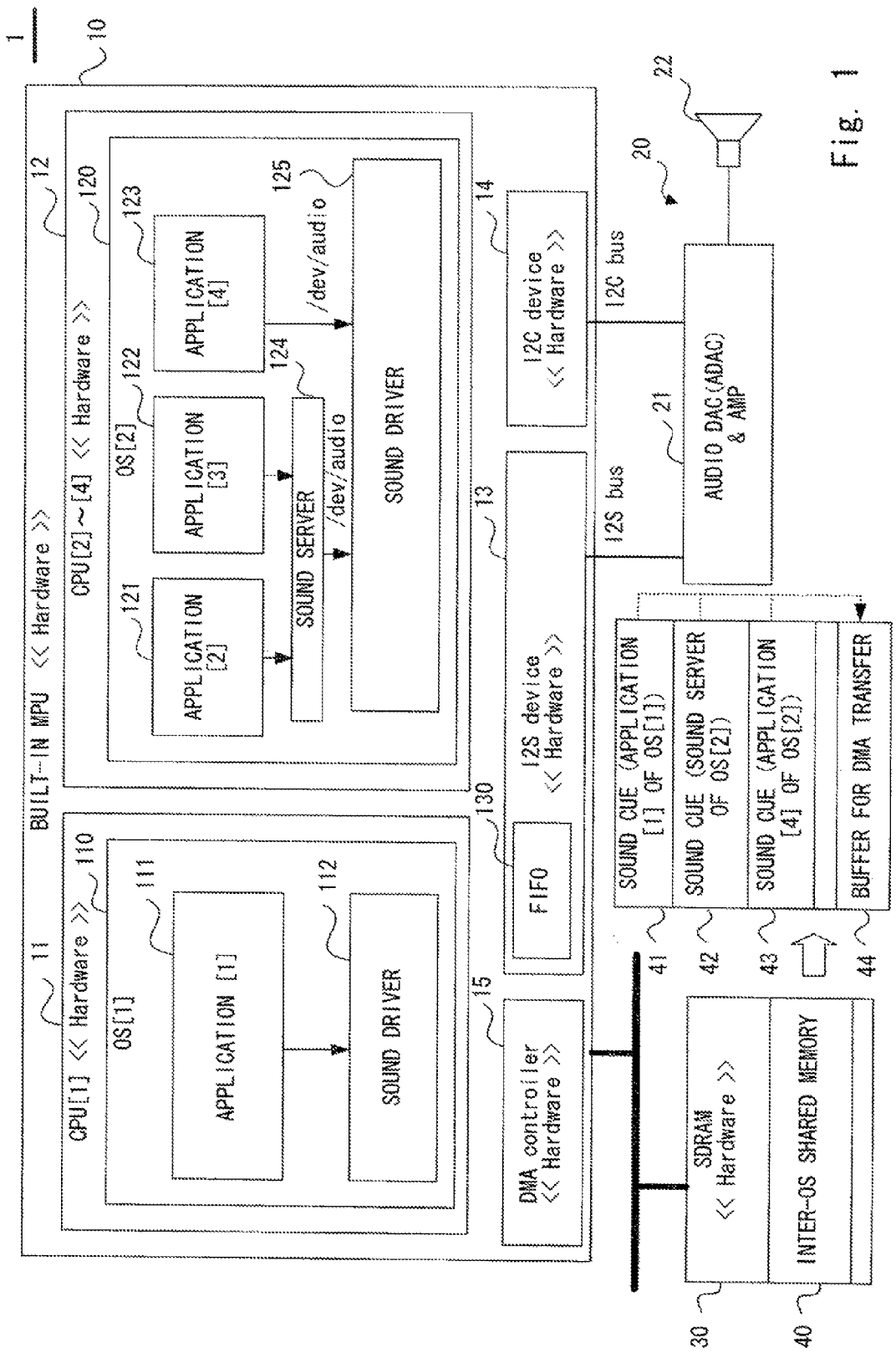
FIG. 1 is a block diagram showing a hardware configuration of a multi-core system according to a first exemplary embodiment of the present invention.

Hereinafter, a first exemplary embodiment of the present invention will be described with reference to the drawings. First, with reference to FIGS. 1 and 2, a configuration of a multi-core system according to the first exemplary embodiment will be described. FIG. 1 is a block diagram showing a hardware configuration of a multi-core system according to the first exemplary embodiment.

As shown in FIG. 1, a multi-core system 1 includes a built-in MPU 10, an audio output apparatus 20, and a synchronous dynamic random access memory (SDRAM) 30 as an external shared memory.

The MPU 10 is an IC that includes multi-core CPUs and peripheral devices (I2S device 13, I2C device 14, and DMA controller 15) mounted in one chip. In the example shown in FIG. 1, the MPU 10 includes a plurality of CPUs (CPU[1] 11, CPU[2]~[4] (hereinafter the plurality of CPUs[2]~[4] are collectively referred to as CPU[2]~[4] 12).

The MPU 10 operates a plurality of OSs on the multi-core CPUs. An OS[1] 110 operates on the CPU[1] 11. An OS[2] 120 operates on the CPU[2]~[4] 12. The OS[1] 110 and the OS[2] 120 are different types of OSs. For example, the OS[1] 110 may be a real-time OS such as μITRON, and the OS[2] 120 may be a high-functional in-built OS (in-built Linux (registered trademark) or Windows CE (registered trademark) or the like).

On the OS[1] 110, an application program [1] 111 (abbreviated as application [1] in the drawings), and a sound driver 112 which is a device driver operate. Audio data output from the application program [1] 111 is input to the sound driver 112. On the OS[2] 120, an application program [2] 121, an application program [3] 122, an application program [4] 123 (abbreviated as application [2], application [3], and application [4] in the drawings, respectively), a sound server 124, and a sound driver 125 which is a device driver operate. Audio data output from the application program [2] 121 and the application program [3] 122 are input to the sound server 124. Audio data output from the sound server 124 and audio data output from the application program [4] 123 are input to the sound driver 125.

The I2S device 13 is a device of one system that transmits audio data to an ADAC& 20 through an I2S bus. The I2S device 13 includes a FIFO 130 where audio data is stored. In this example, the I2S device 13 deals with stereo PCM as the audio data.

The I2C device 14 is a serial bus for controlling devices. The I2C device 14 is used to write data to/read out data from a register included in the ADAC.

The DMA controller 15 controls DMA transfer between the SDRAM 30 connected exterior of the MPU 10 and other devices. In this example, audio data is transferred from an inter-OS shared memory 40 on the SDRAM 30 to the FIFO 130 of the I2S device 13 using one channel of the DMA controller 15.

As an example, in the first exemplary embodiment, the sound driver 125 on the side of the OS[2] 120 typically controls audio mixing processing and peripheral devices (I2S device 13, I2C device 14, and DMA controller 15).

The audio output apparatus 20 includes a speaker 21 and an ADAC& 22. The ADAC& 22 forms an external interface of the audio output apparatus 20. The ADAC& 22 converts and amplifies audio data transmitted through the I2S bus to an analog signal, which is reproduced using the speaker 21.

The SDRAM 30 is a non-volatile memory (RAM) that is connected outside of the MPU 10 through a bus. A memory space shared by the OSs of the MPU 10 is secured in the SDRAM 30 as the inter-OS shared memory 40.

Sound cues (sound cue 41, sound cue 42, and sound cue 43) and a buffer for DMA transfer 44 are set inside the inter-OS shared memory 40. The sound cues are ring buffers that store the audio data output from the application programs. Cues corresponding to the number of application programs that output audio data are created as sound cues. In this example, three sound cues (sound cue 41, sound cue 42, and sound cue 43) corresponding to the application program [1] 111 of the OS[1] 110, the sound server 124 of the OS[2] 120, and the application program [4] 123 of the OS[2] 120 are created. After audio mixing processing is performed on the audio data of the sound cues (sound cue 41, sound cue 42, and sound cue 43), the processed data is stored in the buffer for DMA transfer 44. Note that the sound cues may be formed using other cuing means than the ring buffers.

Figure 2:
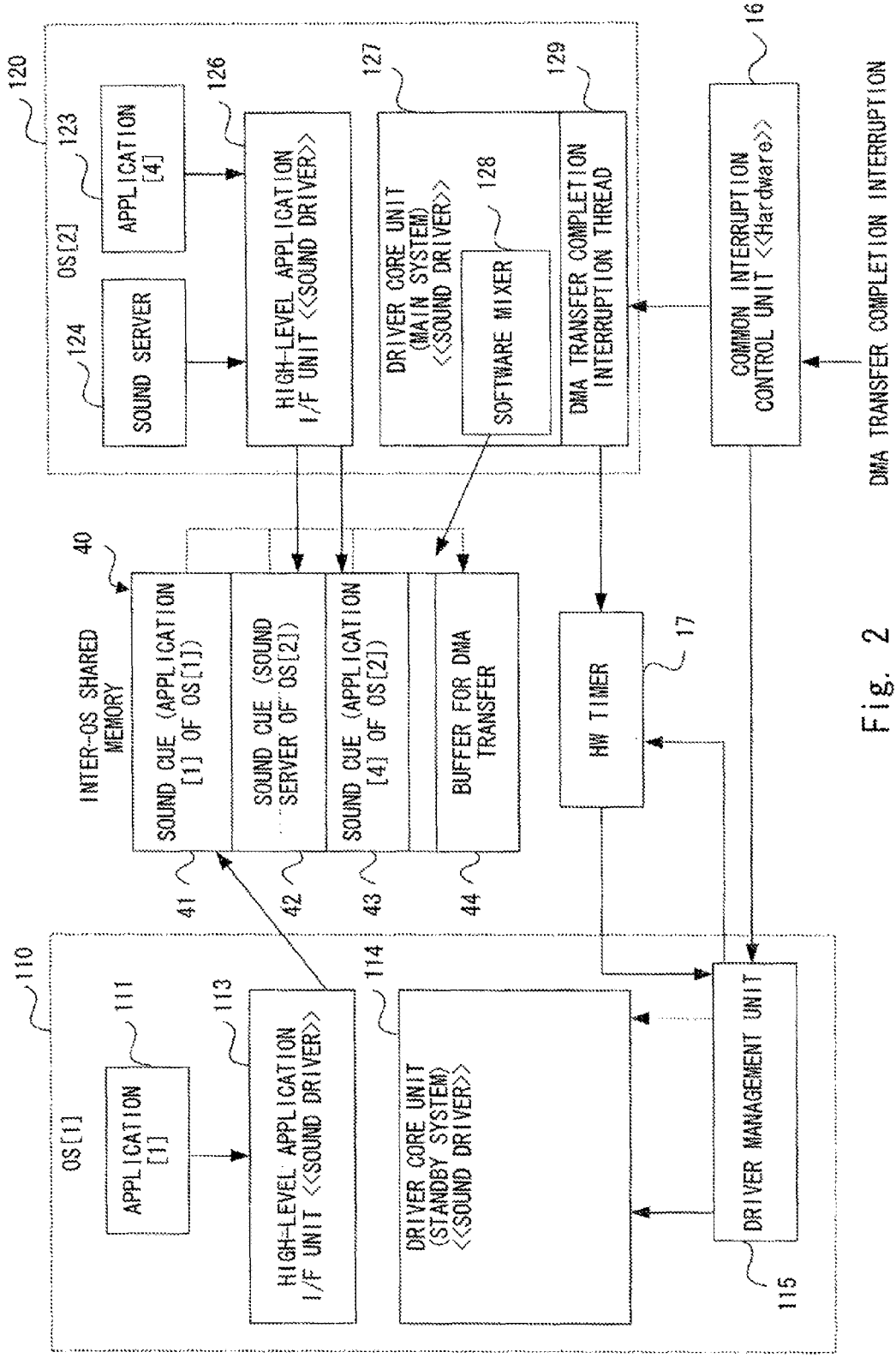
FIG. 2 is a block diagram showing a functional configuration of the multi-core system according to the first exemplary embodiment of the present invention.

FIG. 2 is a block diagram showing a functional configuration of the multi-core system according to the first exemplary embodiment. In FIG. 2, the sound driver 112 shown in FIG. 1 is divided into a high-level application I/F unit 113 and a driver core unit 114. Further, the sound driver 125 is divided into a high-level application I/F unit 126 and a driver core unit 127.

The high-level application I/F unit 113 converts a sampling rate or the number of quantization bits of the audio data received from the application [1] 111 (e.g., converts sound of 48 kHz and 23 bits to sound of 44.1 kHz and 16 bits) as appropriate, and stores the output results in the sound cue 41 in the inter-OS shared memory 40.

Further, the high-level application I/F unit 126 converts a sampling rate or the number of quantization bits of the audio data received from the sound server 124 and the application [4] 123 as appropriate, and stores the output results in the sound cues 42 and 43 in the inter-OS shared memory 40.

Each of the driver core units 114 and 127 mixes audio data stored in each of the sound cues of the inter-OS shared memory 40, and transfers the audio data on which audio mixing processing is performed to the FIFO 130 of the I2S device 13 by DMA. In the first exemplary embodiment, functional parts which are parts of the sound drivers 112 and 125 and perform the audio mixing processing and the control of the I2S device 13 and the I2C device 14 are defined as the driver core units 114 and 125. Further, the audio mixing processing means processing of mixing the audio data from a plurality of application programs operated on each OS and copying the mixed data to an area for DMA transfer (buffer for DMA transfer 44) as a single piece of audio data.

In the first exemplary embodiment, only a driver core unit of one OS (main system) operates among a plurality of OSs when the system operates. The driver core units of the other OSs (standby systems) are normally in a standby state, and operate only when the main-system OS freezes, for example. Note that the main system means a system including a driver core unit that operates in a normal state. The standby system means a system including a driver core unit that operates when the main-system operation is failed. The main system and the standby system here are a main system and a standby system regarding a sound reproducing function (a part of the functions of the sound driver), and do not indicate a main-system OS and a standby-system OS. In short, the standby-system OS means an OS having a function as a standby system regarding a sound reproducing function.

A software mixer 128 is a function called by the driver core unit 127. The software mixer 128 mixes audio data stored in each of the sound cues, and stores the data in the buffer for DMA transfer 44.

A DMA transfer completion interruption thread 129 is a DMA transfer completion interruption thread of audio data. The DMA transfer completion interruption thread 129 exists in the driver core unit 127 and operates upon occurrence of DMA transfer completion interruption of the audio data. The audio mixing processing and the DMA transfer request processing of audio data are performed in the DMA transfer completion interruption thread 129.

A common interruption control unit 16 allocates an interrupt request (IRQ) to each of the CPU cores. The common interruption control unit 16 is basically included in the MPU 10 as a hardware function. When the common interruption control unit 16 is not mounted as the hardware function in the MPU 10, it may be mounted as a software function.

The interrupt request input to the common interruption control unit 16 is a DMA transfer completion interruption issued by the DMA controller 15 upon completion of the DMA transfer of the audio data. When the DMA transfer request is not issued within a predetermined period of time after the occurrence of the DMA transfer completion interruption, the buffer of the FIFO 130 of the I2S device 13 becomes vacant, which results in occurrence of an I2S under-run error.

A driver management unit 115 is a function called by an interruption handler of the standby-system OS. The driver management unit 115 sets a HW (Hard Ware) timer 17 and performs switching processing for switching the operation using the driver core unit of the main system to the operation using the driver core unit of the standby system. Note that the HW timer 17 here indicates a hardware timer included in the MPU 10.

Figure 3:
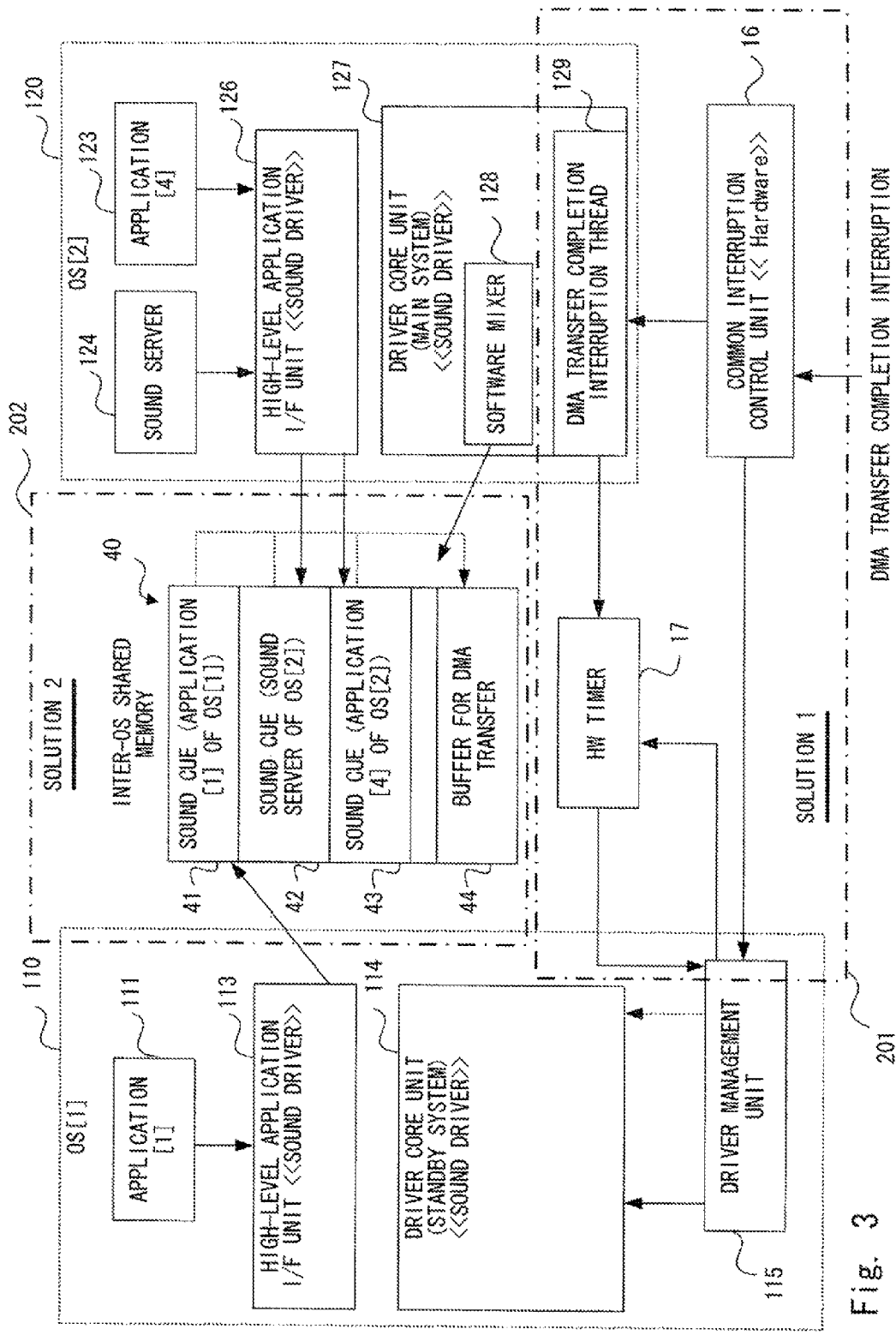
FIG. 3 is a diagram for describing the summary of means for solving problems according to the first exemplary embodiment of the present invention.

Referring next to FIG. 3, an operation of means for solving problems using the multi-core system according to the first exemplary embodiment will be schematically described. The multi-core system 1 includes a solution [1] 201 and a solution [2] 202, and the problems can be solved based on the configuration and the operation in these solutions. Hereinafter, the solution [1] 201 and the solution [2] 202 will be described.

In the solution [1] 201, each of the plurality of OSs (OS[1] 110, OS[2] 120) receives a single DMA transfer completion interruption with use of the common interruption control unit 16. Then, the interruption handler included in the standby-system OS (OS[1] 110) sets a plurality of HW timers 17 (HW timer 1, HW timer 2). Further, the DMA transfer completion interruption thread 129 of the main-system OS (OS[2] 120) cancels the HW timer 17 that is set. The details of the processing for monitoring the main-system OS (OS[2] 120) using the HW timer 17 and the processing for switching the main-system OS (OS[2] 120) to the standby-system OS (OS[1] 110) will be described later. While the plurality of HW timers (HW timer 1 and HW timer 2) are used as the HW timer 17 in this example, a single HW timer may be used to artificially achieve a plurality of timers.

Possibly, the HW timer 17 may not be appropriately set by the interruption handler of the main-system OS (OS[2] 120) when the content of the register of the CPU core allocated to the main-system OS (OS[2] 120) is corrupted or multiple interruption occurs when the OS freezes. Accordingly, by designing the standby-system OS (OS[1] 110) to set the HW timer 17, it is possible to deal with the problems when an exception occurs in the main-system OS (OS[2] 120) or the main-system OS (OS[2] 120) freezes. Note that the multiple interruption when the OS freezes means that other interruption occurs in a middle of the processing of the DMA transfer completion interruption and a system call of the OS is called in the interruption handler.

With reference to FIGS. 4A, 4B to 6, the processing in the solution [1] 201 described above will be described further in detail. First, with reference to FIGS. 4A and 4B, the audio data in the DMA transfer completion interruption thread 129 and the process flow will be described.

Figure 4A:
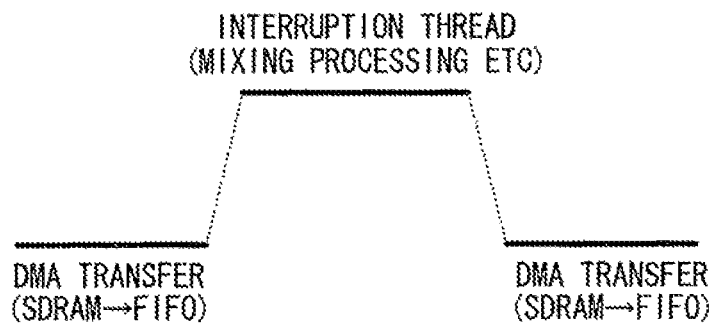
FIG. 4A is a diagram for describing audio data and a process flow in a DMA transfer completion interruption thread according to the first exemplary embodiment of the present invention.

FIG. 4A shows audio data and a process flow. Specifically, after the DMA is transferred from the SDRAM 30 to the FIFO 130, the plurality of OSs (OS[1] 110, OS[2] 120) receive the DMA transfer completion interruption. When the main-system OS (OS[2] 120) normally operates, the DMA transfer completion interruption that is received arrives at the DMA transfer completion interruption thread 129. The DMA transfer completion interruption thread 129 then operates upon receiving the DMA transfer completion interruption of the audio data, and the audio mixing processing of the audio data and DMA transfer request processing are executed in the DMA transfer completion interruption thread 129. Then, the audio data after audio mixing processing stored in the buffer for DMA transfer 44 is transferred from the SDRAM 30 to the FIFO 130 by DMA.

Figure 4B:
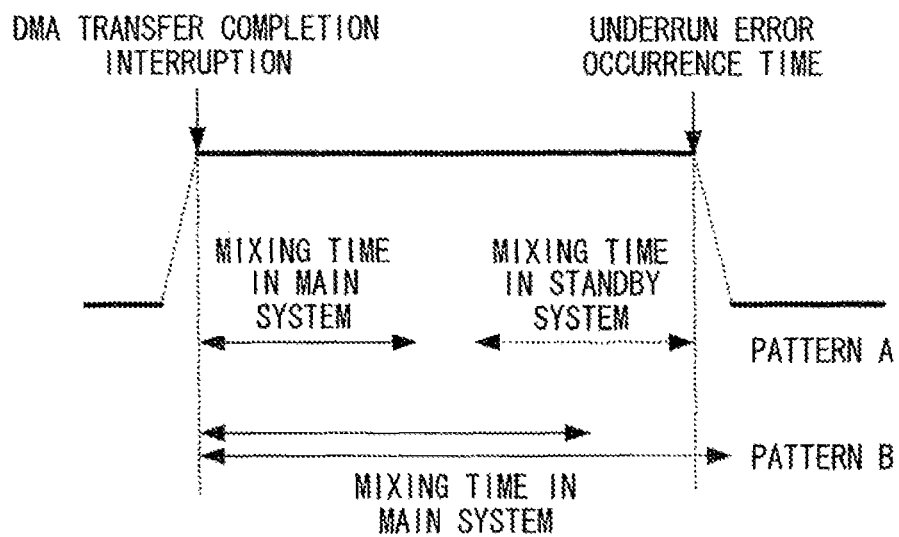
FIG. 4B is a diagram for describing audio data and a process flow in a DMA transfer completion interruption thread according to the first exemplary embodiment of the present invention.

FIG. 4B is a diagram for describing the processing method of the audio mixing processing and the DMA transfer start request processing performed in the DMA transfer completion interruption thread 129. In this example, regarding the processing order of the audio mixing processing and the DMA transfer start request processing, one of the pattern A and the pattern B is selected based on the relation between the I2S underrun error and the audio mixing processing time in the main-system OS (OS[2] 120).

As described above, when the main-system OS (OS[2] 120) freezes, the DMA transfer completion interruption does not reach the DMA transfer completion interruption thread 129. Accordingly, the DMA transfer request processing is not performed within a predetermined period of time from the occurrence of the DMA transfer completion interruption, which results in occurrence of the I2S underrun error. In short, when the DMA transfer interval (time from the occurrence of the DMA transfer completion interruption to the occurrence of the I2S underrun error) exceeds a predetermined period of time, it is determined as the underrun error and sound interruption occurs.

The audio mixing processing time and the DMA transfer interval ($\approx$I2S underrun error occurrence time) are determined based on a specification of an execution environment. Accordingly, one of the pattern A and the pattern B described below is selected as the processing method in the DMA transfer completion interruption thread 129 according to the selection condition specified using the magnitude relation of the audio mixing processing time and the DMA transfer interval. Note that the audio mixing processing time and the DMA transfer interval can be calculated from the number of steps of the FIFO 130 of the I2S device 13, the audio sampling frequency, the size of the DMA transfer, CPU clocks, and the like.

When the selection condition "DMA transfer interval> (audio mixing processing time×2)" is satisfied, the pattern A is selected. According to the pattern A, the audio mixing processing is performed, followed by the DMA transfer start request processing. In short, in this case, the audio mixing processing is performed prior to the DMA transfer start request processing. When the pattern A shown in the right side of FIG. 4 is selected and the OS freezes in a middle of the audio mixing processing in the main-system OS (OS[2] 120), and the main-system OS (OS[2] 120) is switched to the standby-system OS (OS[1] 110) to continue the audio mixing processing. The details of the method of monitoring the freeze in the OS and the method of switching to the standby system will be described later.

When the selection condition "DMA transfer interval< (audio mixing processing time×2)" is satisfied, the pattern B is selected. In the pattern B, the DMA transfer start request processing is performed, followed by the audio mixing processing. In short, in this case, the DMA transfer start request processing is performed prior to the audio mixing processing. Further, double buffering processing of the audio data is required to pre-read the data by one packet (=DMA transfer size) of the audio data that is transferred by DMA.

In the following description, a case will be described in which the pattern A is selected as the processing method of the sound driver in the main-system OS (OS[2] 120) in the DMA transfer completion interruption thread 129 (a case of performing the DMA transfer start request processing subsequent to the audio mixing processing). Since the process flow when the pattern B is selected is basically the same, the pattern A will be described in the following description as a representative, for example.

Next, a monitoring function of the main-system OS (OS[2] 120) using the HW timer 17 will be described. The following description will be made by taking a case in which the HW timer 17 of two systems (HW timer 1, HW timer 2) is employed as an example.

As described above, when the DMA transfer completion interruption is received, the interruption handler included in the standby-system OS (OS[1] 110) sets the HW timer 17. When the DMA transfer completion interruption reaches the DMA transfer completion interruption thread 129 of the main-system OS (OS[2] 120), the DMA transfer completion interruption thread 129 cancels the HW timer 17 that is set. Accordingly, when the DMA transfer completion interruption does not reach the DMA transfer completion interruption thread 129 of the main-system OS (OS[2] 120), the HW timer 17 that is set is timed out without being cancelled. Accordingly, the freeze of the main-system OS (OS[2] 120) can be monitored based on the detection of timeout by the HW timer 17.

Specifically, the HW timer 1 and the HW timer 2 are set as the HW timer 17 to monitor the freeze in the main-system OS (OS[2] 120). The HW timer 1 is used to monitor the audio mixing processing end time. The HW timer 2 is used to monitor the DMA transfer start time. Note that the HW timer 1 and HW timer 2 of two systems that are independent from each other can be set as the HW timer 17; otherwise a timer of two systems can be artificially achieved by setting a single HW timer 17.

When the main-system OS (OS[2] 120) freezes, the main-system OS (OS[2] 120) is switched to the standby-system OS (OS[1] 110) to continue the audio mixing processing. Accordingly, the audio mixing processing in the standby-system OS (OS[1] 110) needs to be completed before the occurrence time of the underrun error in the I2S device 13 after the device is switched to the standby-system OS (OS[1] 110). Accordingly, the audio mixing processing end time in the main-system OS (OS[2] 120) monitored using the HW timer 1 can be indicated as "I2S underrun error occurrence time-audio mixing processing time (in the standby system)" using the occurrence time of the underrun error in the I2S device 13 and the audio mixing processing time required for the audio mixing processing in the standby-system OS (OS[1] 110). Accordingly, it is possible to detect the freeze in the main-system OS (OS[2] 120) during the audio mixing processing with use of the HW timer 1.

Further, the DMA transfer request processing needs to be completed in the standby-system OS (OS[1] 110) before the occurrence time of the underrun error in the I2S device 13 after the device is switched to the standby-system OS (OS[1] 110). Accordingly, the DMA transfer start time monitored by the HW timer 2 can be indicated as "I2S underrun occurrence time-DMA transfer request processing time" using the occurrence time of the underrun error in the I2S device 13 and the DMA transfer request processing time required for the DMA transfer request processing in the DMA transfer completion interruption thread 129. With use of the HW timer 2, monitoring can be performed also in a case in which a plurality of DMA transfer completion interruption threads 129 are processed. Accordingly, monitoring can be performed also in a case in which the audio mixing processing time in the main-system OS (OS[2] 120) exceeds the occurrence time of the I2S underrun error.

Figure 5:
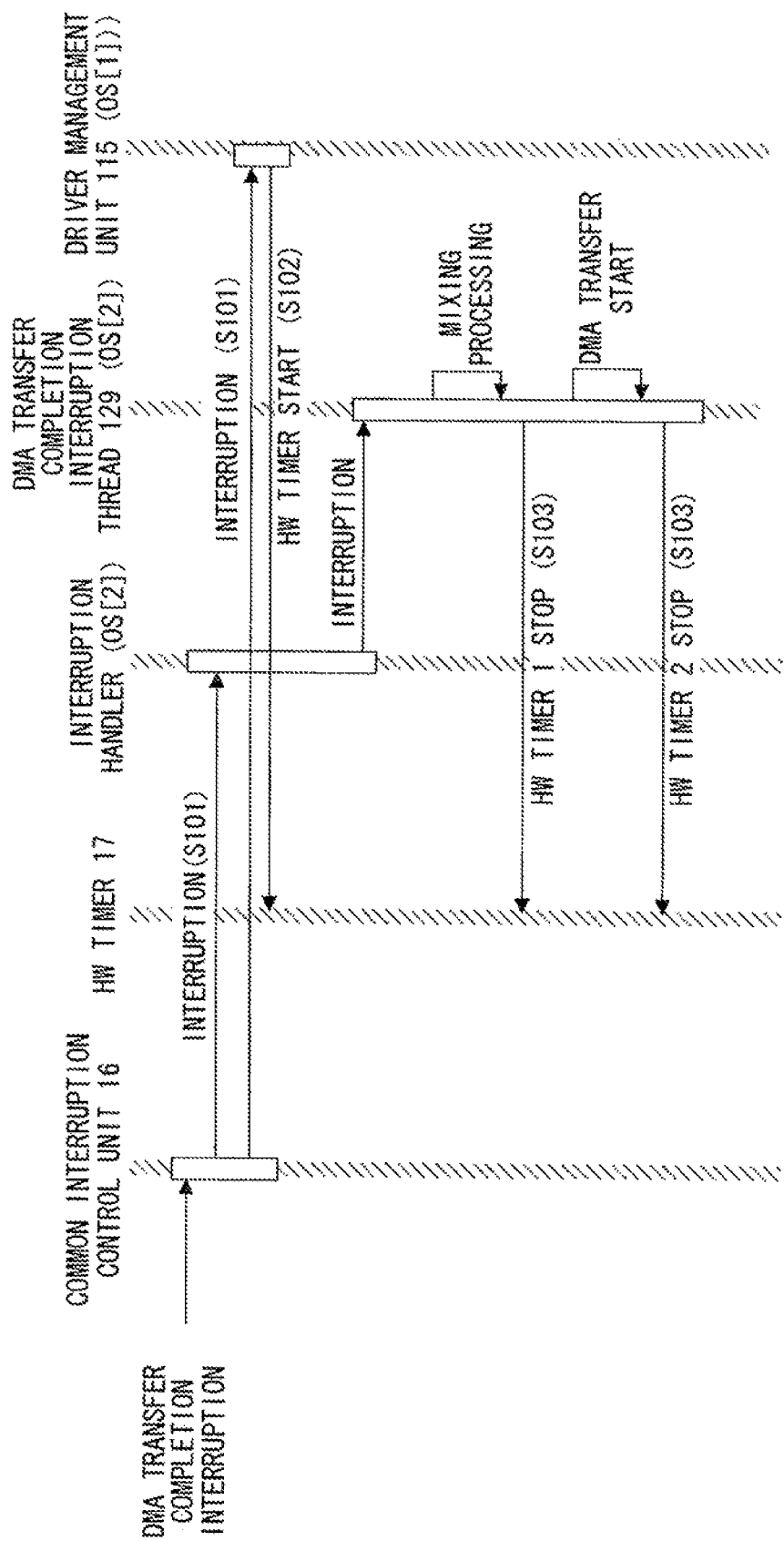
FIG. 5 is a sequence diagram showing processing after reception of DMA transfer completion interruption when a main-system OS normally operates according to the first exemplary embodiment of the present invention.
Figure 6:
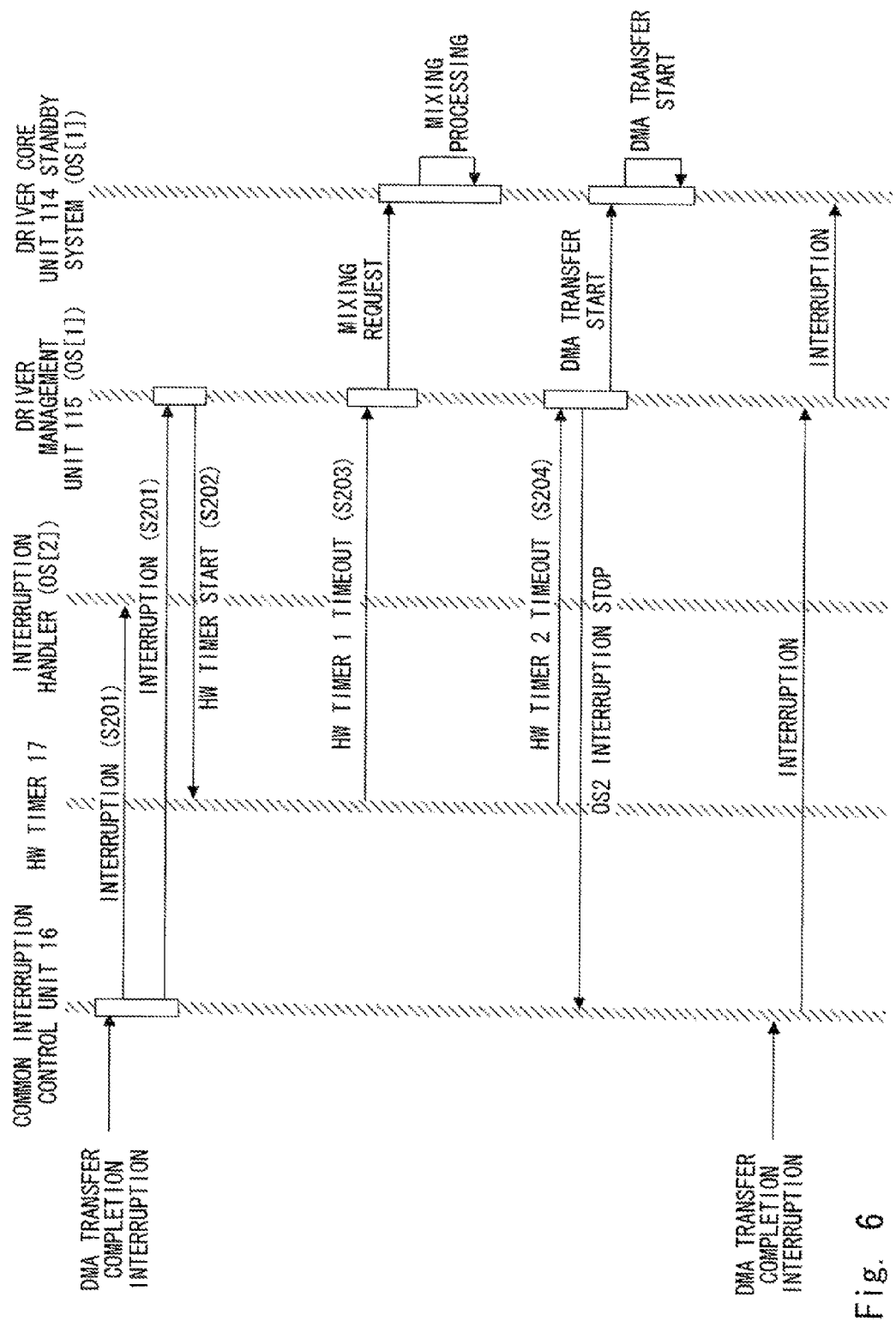
FIG. 6 is a sequence diagram showing processing after reception of DMA transfer completion interruption when a failure is occurred in a main-system OS according to the first exemplary embodiment of the present invention.

Referring now to FIGS. 5 and 6, description will be made of a switching operation of a driver core unit when a freeze in the main-system OS (OS[2] 120) is detected using the HW timer 17. Referring first to FIG. 5, processing after receiving the DMA transfer completion interruption will be described when the main-system OS (OS[2] 120) normally operates.

FIG. 5 is a sequence diagram for describing the audio mixing processing and the DMA transfer processing when the main-system OS normally operates. First, when the MPU 10 receives the DMA transfer completion interruption, the common interruption control unit 16 transmits an interruption request (IRQ) to the plurality of CPU cores (S101).

Next, when the driver management unit 115 that operates on the standby-system OS (OS[1] 110) receives the interrupt request (IRQ) from the common interruption control unit 16, the driver management unit 115 starts the HW timer 17 of two systems at the same time (S102). Note that the timeout period of the HW timer 1 may be set as about from several hundred μs to several ms.

Next, since the main-system OS (OS[2] 120) normally operates, the DMA transfer completion interruption reaches the DMA transfer completion interruption thread 129. Accordingly, the audio mixing processing and the DMA transfer request processing of the audio data are performed in the DMA transfer completion interruption thread 129 upon occurrence of the DMA transfer completion interruption. Then the DMA transfer completion interruption thread 129 of the main-system driver core unit 127 stops the HW timer 1 and the HW timer 2 (S103). The HW timer 1 is cancelled upon completion of the audio mixing processing, and the HW timer 2 is cancelled upon termination of the DMA transfer request processing.

FIG. 6 is a sequence diagram for describing processing for continuously performing the audio mixing processing and the DMA transfer processing using the standby-system OS when the main-system OS is failed (e.g., the operation of the system is unexpectedly stopped, or the OS is abnormally terminated). Since the processing in S201 and S202 in FIG. 6 is the same to the processing in S101 and S101 shown in FIG. 5, the description will be omitted here.

In FIG. 6, when the main-system OS (OS[2] 120) freezes, the DMA transfer completion interruption transmitted in S201 does not reach the DMA transfer completion interruption thread 129. Accordingly, after the HW timer 17 is set in S202, the audio mixing processing and the DMA transfer request processing of the audio data are not performed in the DMA transfer completion interruption thread 129. Accordingly, timeout of the HW timer 1 is notified to the driver management unit 115 of the standby-system OS (OS[1] 110) (S203). When the HW timer 1 is timed out, the driver management unit 115 requests start of the audio mixing processing from the driver core unit 114 of the standby-system. Accordingly, the driver core unit 114 of the standby-system starts the audio mixing processing.

Next, timeout of the HW timer 2 is notified to the drive management unit 115 of the standby-system OS (OS[1] 110) (S204). When the HW timer 2 is timed out, the driver management unit 115 instructs the common interruption control unit 16 to stop notification of the DMA transfer interruption to the main-system OS (OS[2] 120) that is frozen. The driver management unit 115 then requests start of the DMA transfer request processing from the driver core unit 114 of the standby-system. Then, the driver core unit 114 of the standby-system starts the DMA transfer request processing.

Referring back to FIG. 3, the solution [2] 202 will be described. As described above, when the HW timer 17 that is set is timed out due to the freeze in the main-system OS (OS[2] 120), a part of the functions of the sound driver is switched from the main-system OS (OS[2] 120) to the standby-system OS (OS[1] 110). In the solution [2] 202, when the standby-system OS (OS[1] 110) starts the audio mixing processing after the main-system OS (OS[2] 120) freezes in a middle of the audio mixing processing, processing is performed for assuring integrity of stream data (audio data or the like) around the time of the freeze.

The processing for maintaining the integrity of the stream data includes processing performed using a newly-provided parameter and processing for disabling a base address of the peripheral device referred to by the main-system OS (OS[2] 120). Hereinafter, by referring to FIGS. 7 and 8, each processing will be described in detail.

Described first is processing using a parameter that is newly set, which is one of the processing to maintain the integrity of the stream data. In the first exemplary embodiment, a dequeue dedicated parameter used by the standby-system OS (OS[1] 110) is newly set in addition to a parameter of a general cue regarding a parameter of the sound cue. This addition of the parameter is effective when the main-system OS (OS[2] 120) freezes in a middle of the dequeue processing (audio mixing processing or the like) from the main-system OS (OS[2] 120).

Figure 7:
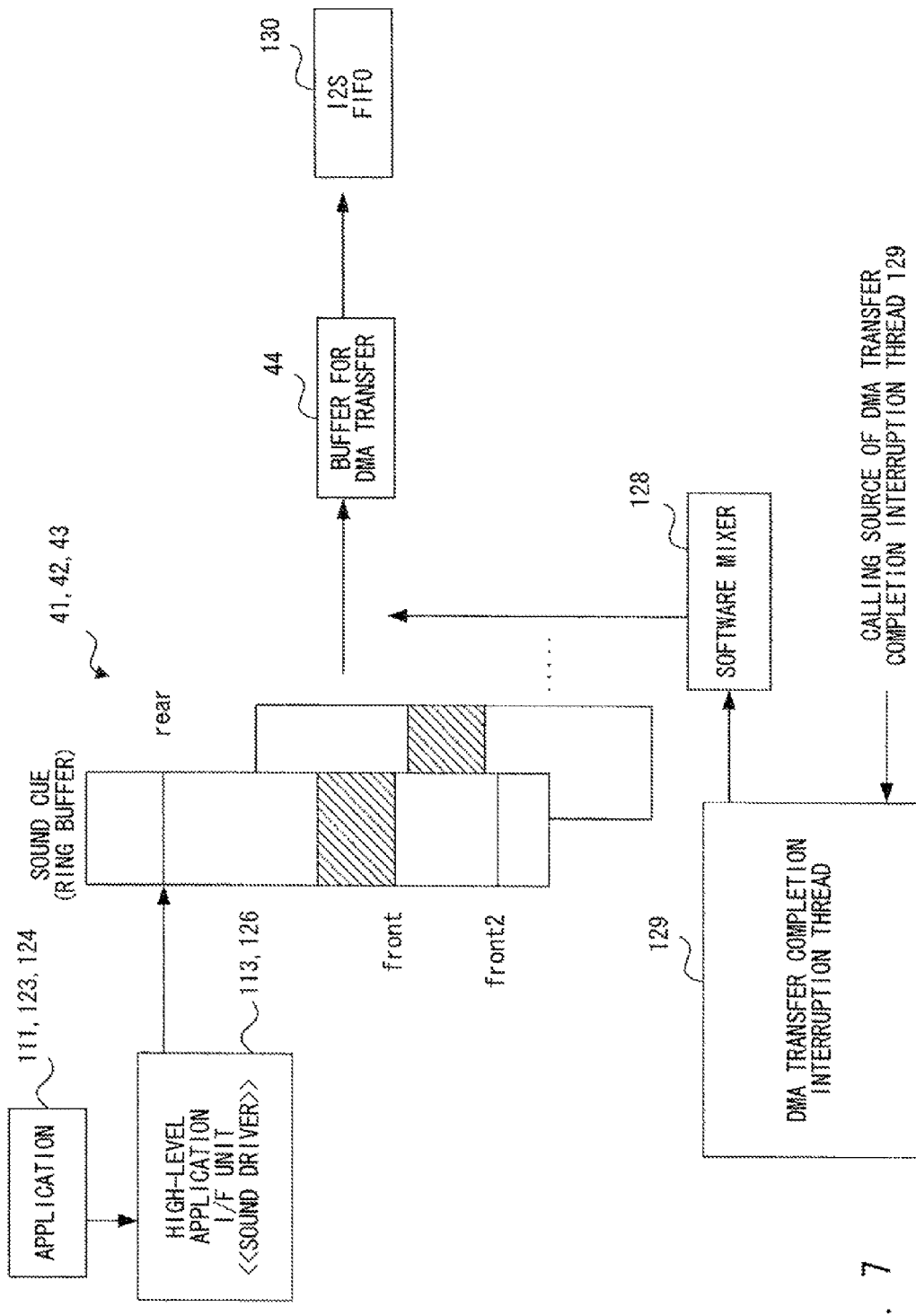
FIG. 7 is a diagram for describing an additional parameter regarding a sound cue according to the first exemplary embodiment of the present invention.

Description will be made further in detail with reference to FIG. 7. As shown in FIG. 7, in the first exemplary embodiment, a parameter front 2 is added in addition to parameters (front, rear) of a typical ring buffer to each sound cue (ring buffer). The front here is a parameter for dequeue used by the main-system driver core unit 127. Further, the rear is a parameter for enqueue used by the high-level application I/F units 126 and 113 of each OS. Further, the front 2 is a parameter for dequeue used by the driver core unit 114 of the standby-system.

The parameter front 2 is used to maintain the integrity of the audio data when the main-system OS (OS[2] 120) freezes in a middle of the audio mixing processing. For example, when the standby-system OS (OS[1] 110) is in a standby mode, the main-system driver core unit 127 counts the front 2 for the number of times of the DMA transfer upon occurrence of the first full interruption in the FIFO 130 of the I2S device 13 after the DMA transfer start request. The method of counting the front 2 is not limited to this, but any simpler method may be used. For example, the main-system DMA transfer completion interruption thread may be configured to count the front 2 at the exit of the thread.

When the main-system OS (OS[2] 120) normally operates, in the DMA transfer completion interruption thread 129, (1) the HW timer 1 is cancelled (solution 1), (2) a software mixer function is called to perform processing for mixing a plurality of voices, (3) the HW timer 2 is cancelled (solution 1), and (4) the DMA transfer request processing of the stereo audio data on which mixing processing is performed is executed. A calling source of the DMA transfer completion interruption thread 129 is a sound reproduction start function in the driver core unit for the first time, and is the DMA transfer completion interruption for the second and the following times.

When the main-system OS (OS[2] 120) normally operates, the audio data (parts shown by oblique lines in FIG. 7) from the position shown using the front is dequeued (this dequeue processing is counted using the front) in the DMA transfer completion interruption thread 129. Next, the main-system driver core unit 127 performs mixing processing of the plurality of pieces of audio data output from the sound cue using the software mixer function that is called. Then, the audio data after audio mixing processing stored in the buffer for DMA transfer 44 is transferred from the SDRAM 30 to the FIFO 130 of the I2S device 13 by DMA (in this example, the number of times of DMA transfer is counted using the front 2).

Accordingly, when the main-system OS (OS[2] 120) normally operates, after the front and the front 2 are started from the same position, the front 2 changes following the front. Meanwhile, when the main-system OS (OS[2] 120) freezes, the dequeue of the audio data is interrupted, and the count of the front stops. Further, the DMA transfer is not performed due to the freeze of the main-system OS (OS[2] 120). Accordingly, a count of the front 2 is also stopped and the position of the front 2 is not updated.

Assume here a situation as shown in FIG. 7. When the main-system OS (OS[2] 120) freezes, and the front and the front 2 stop, the driver core unit 114 of the standby-system that is switched starts dequeue of the audio data from the position shown with the front using a software mixer function that is called. In such a situation, when the dequeue of the audio data is started from the position indicated using the front, the audio data that may be corrupted is dequeued, and the integrity of audio data cannot be guaranteed. In order to avoid this, when the main-system OS (OS[2] 120) freezes and the front and the front 2 stop, the switched driver core unit 114 of the standby-system starts the dequeue of the audio data from the position indicated using the front 2 using the software mixer function that is called. Accordingly, the dequeue can be started from the audio data before the main-system OS (OS[2] 120) freezes, which makes it possible to ensure the integrity of the audio data around the time of the freezing.

Described next is processing for disabling the base address of the peripheral device referred to by the main-system OS (OS[2] 120) which is one of processing for maintaining the integrity of the stream data. When the device is switched to the standby-system OS (OS[1] 110) and the driver core unit 114 of the standby-system (driver core unit that newly serves as the main system) that is switched is performing the audio mixing processing, the DMA register access from the driver core unit 127 (hereinafter may be simply referred to as a (former) main-system driver core unit 127) which was the main-system is prohibited, thereby ensuring the integrity of the audio data.

Figure 8:
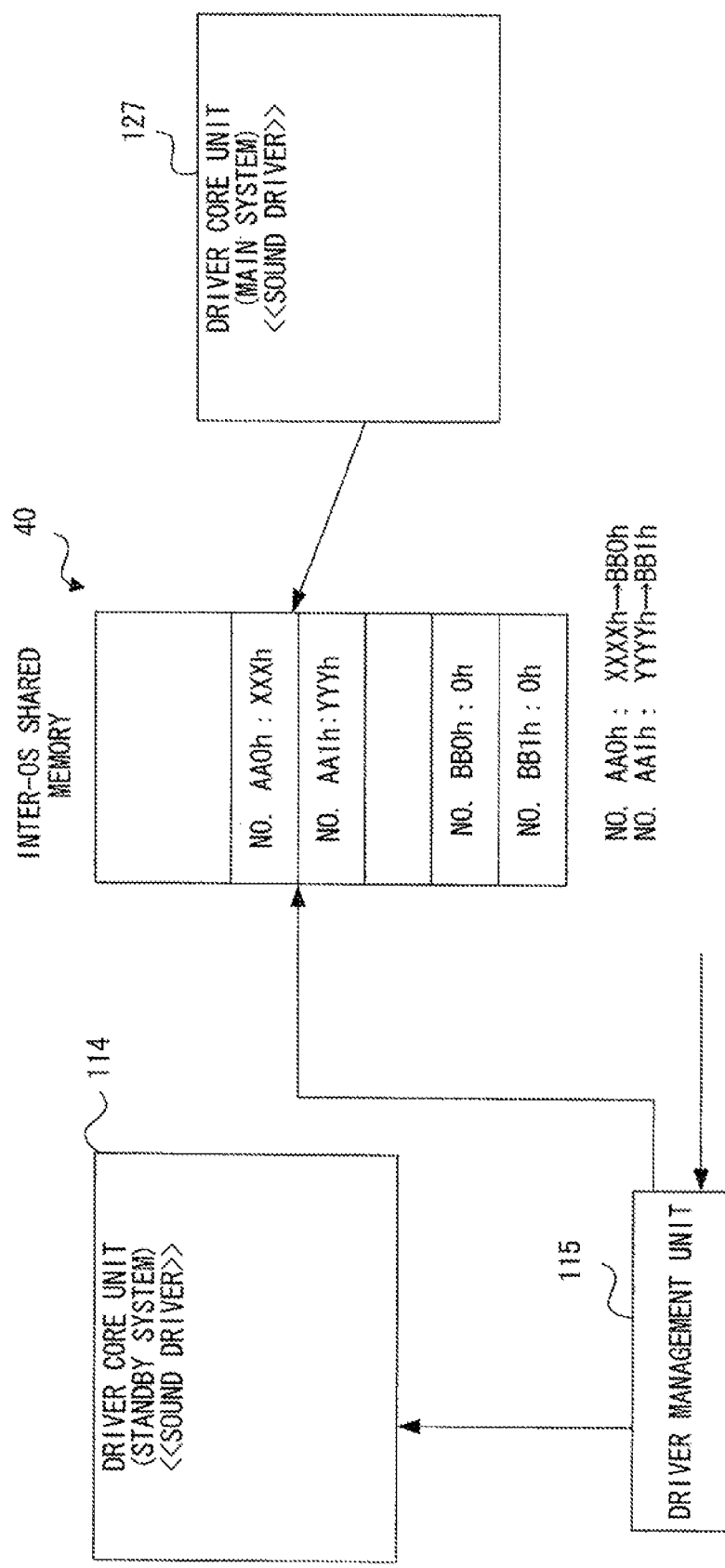
FIG. 8 is a diagram for describing prohibition of register access by the main-system OS before switching according to the first exemplary embodiment of the present invention.
Figure 9:
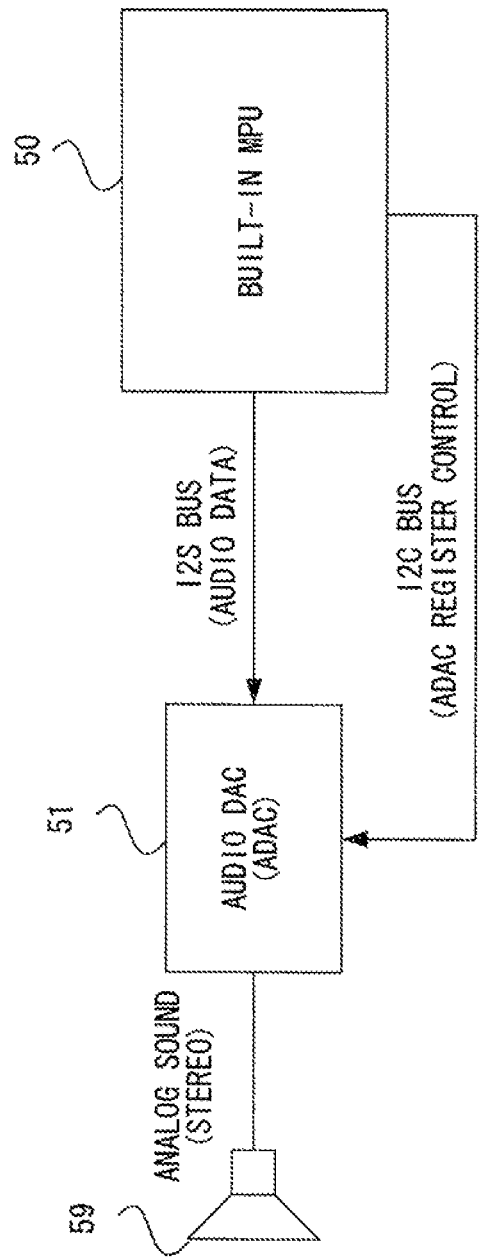
FIG. 9 is a diagram for describing a technique related to the present invention.
Figure 10:
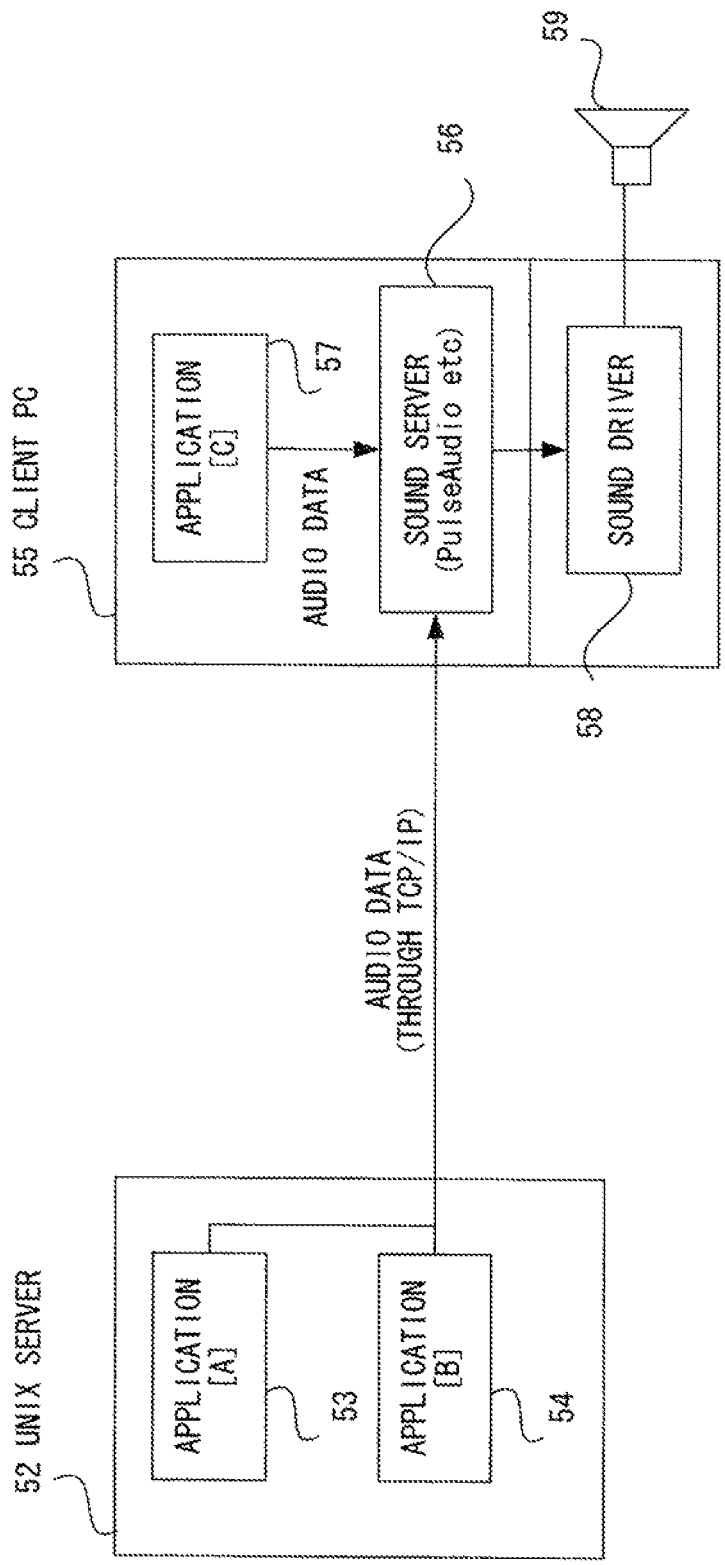
FIG. 10 is a diagram for describing a technique related to the present invention.
Figure 11:
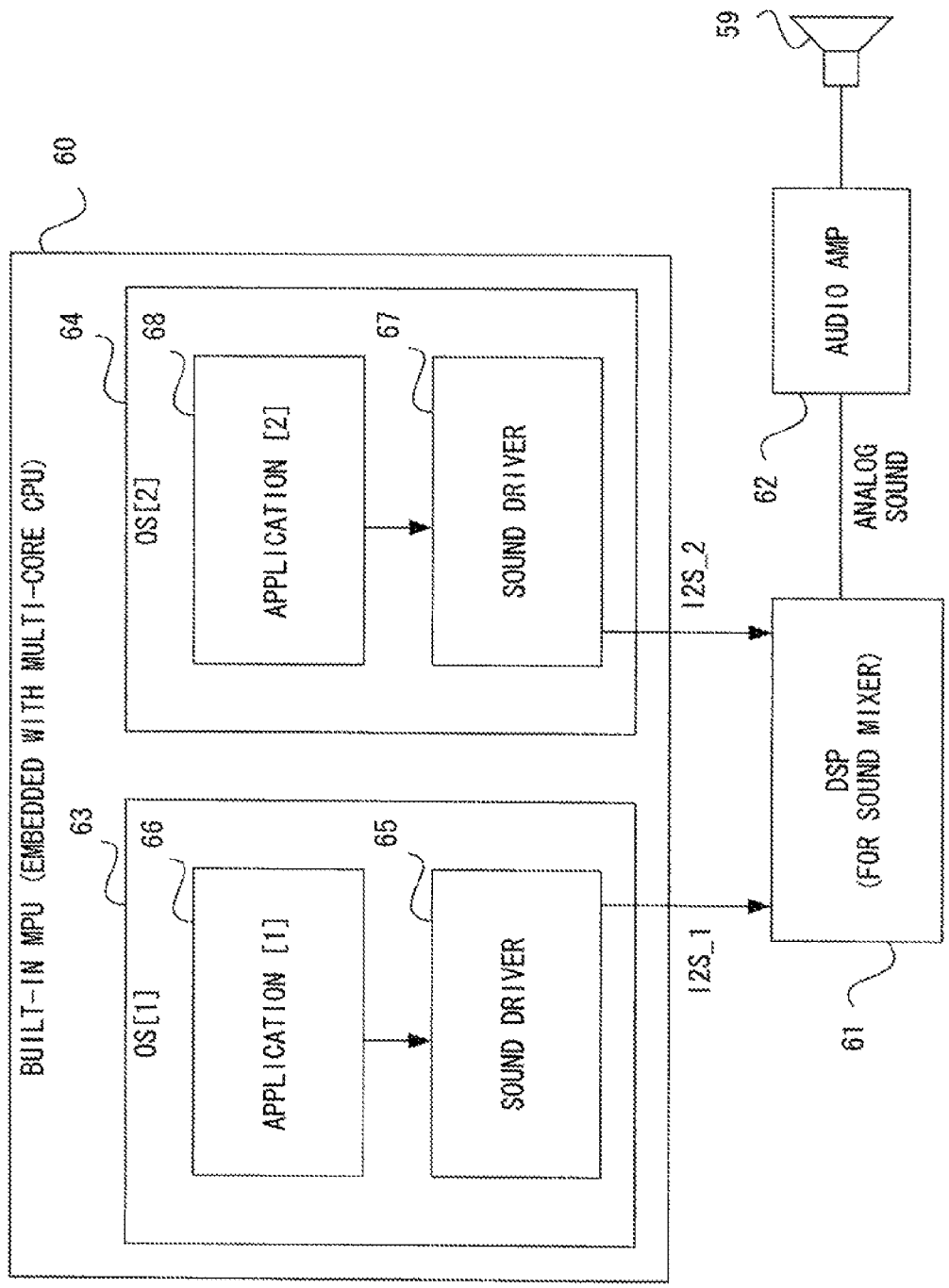
FIG. 11 is a diagram for describing a technique related to the present invention.

Assume here, as shown in FIG. 8, that the base address of the peripheral device (I2S device 13, DMA controller 15) on the shared memory (SDRAM 30) referred to by the main-system OS (OS[2] 120) is as follows: the base address of the I2S device 13 is YYYh, and the base address of the DMA controller 15 is XXXh. The standby-system driver management unit 110 temporarily sets the base addresses of the I2S device 13 and the DMA controller 15 referred to by the driver core unit 127 to invalid addresses (which becomes unused space or the like on the SDRAM 30) according to the timeout of the HW timer 2 (DMA transfer start time). Then the standby-system driver management unit 110 switches the device to the standby-system OS (OS[1] 110). Accordingly, it is possible to prevent the (former) main-system OS (OS[2] 120) which was a main system before switching from accessing the register.

The following effects can be obtained by using the solution 1 and the solution 2 described above.

First, in a configuration in which a plurality of OSs share the I2S bus of audio output, even when the operation of one OS stops, it is possible to prevent the audio output from the other OS from being interrupted. Further, it is possible to deal with the freeze that occurs in a middle of the processing of the sound driver in the DMA transfer completion interruption thread for the main-system sound driver. Further, since there is no need to mount a plurality of I2S devices and an external sound mixer (DSP or the like), this can lead to cost reduction.

Furthermore, the sound server is not necessarily mounted, which eliminates the need to mount the TCP/IP protocol stack on all the OSs. This can prevent increases in memory utilization and CPU load and a delay of the system start-up time that can be brought about due to the mounting of the TCP/IP.

Other Exemplary Embodiments

Although the exemplary embodiments have been described by taking a case in which a MPU 10 includes two OSs (OS[1] 110, OS[2] 120) as an example, the present invention is not limited to it. Specifically, the MPU 10 may include three or more OSs. In such a case, a plurality of standby-system OSs are provided.

When the present invention is achieved by a computer program, the program can be stored and provided to a computer using any type of non-transitory computer readable media. The non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present invention is not limited to the exemplary embodiments stated above, but may be changed as appropriate without departing from the spirit of the present invention.

This application claims the benefit of priority, and incorporates herein by reference in its entirety, the following Japanese Patent Application No. 2009-190103 filed on Aug. 19, 2009.

REFERENCE SIGNS LIST

1 MULTI-CORE SYSTEM
10 MPU
11 CPU[1]
110 OS[1]
111 APPLICATION [1]
112 SOUND DRIVER
113 HIGH-LEVEL APPLICATION I/F UNIT
114 DRIVER CORE UNIT
115 DRIVER MANAGEMENT UNIT
12 CPU[2]~[4]
120 OS[2]
121 APPLICATION [2]
122 APPLICATION [3]
123 APPLICATION [4]
124 SOUND SERVER
125 SOUND DRIVER
126 HIGH-LEVEL APPLICATION I/F UNIT
117 DRIVER CORE UNIT
128 SOFTWARE MIXER
129 DMA TRANSFER COMPLETION INTERRUPTION THREAD

13 I2S DEVICE
130 FIFO
14 I2C DEVICE
15 DMA CONTROLLER
16 COMMON INTERRUPTION CONTROL UNIT
17 HW TIMER
20 AUDIO OUTPUT APPARATUS
21 AUDIO DAC&
22 SPEAKER
30 SDRAM
40 INTER-OS SHARED MEMORY
41, 42, 43 SOUND CUE
44 BUFFER FOR DMA TRANSFER
50 MPU
51 AUDIO DAC
52 UNIX (REGISTERED TRADEMARK) SERVER
53 APPLICATION [A]
54 APPLICATION [B]
55 CLIENT PC
56 SOUND SERVER
57 APPLICATION [C]
58 SOUND DRIVER
59 SPEAKER
60 MPU
61 DSP
62 AUDIO AMP
63 OS[1]
64 OS[2]
65 SOUND DRIVER
66 APPLICATION [1]
67 SOUND DRIVER
68 APPLICATION [2]
210, 220 OPERATING SYSTEM
211, 212 PROCESSOR
240 SHARED MEMORY
213 PERIPHERAL DEVICE
227 DEVICE DRIVER
215 DRIVER MANAGEMENT UNIT
214 DEVICE DRIVER

The invention claimed is:

1. A multi-core system comprising a plurality of operating systems set as a main system and a standby system for a sound reproducing function, comprising:
    a plurality of processors for operating the plurality of operating systems;
    a shared memory shared by the plurality of operating systems;
    a peripheral device shared by the plurality of operating systems and receiving audio data stored in the shared memory, the audio data being transferred by DMA;
    a device driver of the main system included in the operating system of the main system or operating on the operating system of the main system;
    a driver management unit included in the operating system of the standby system or operating on the operating system of the standby system; and
    a device driver of the standby system included in the operating system of the standby system or operating on the operating system of the standby system, the device driver being managed by the driver management unit, wherein
    the driver management unit sets a timer according to a DMA transfer completion interruption request to detect a failure of the operating system of the main system according to detection of timeout by the timer, and
    upon detection of the failure of the operating system of the main system, the driver management unit switches the operating system of the standby system as the operating system of the main system, operates the device driver of the standby system, to continuously execute audio mixing processing of audio data and DMA transfer request processing.

2. The multi-core system according to claim 1, further comprising a common interruption control unit for receiving a single DMA transfer completion interruption and notifying each of the plurality of operating systems of the DMA transfer completion interruption.

3. The multi-core system according to claim 1, wherein
    upon reception of the DMA transfer completion interruption request, the driver management unit sets a first timer to monitor an end time of the audio mixing processing to detect a failure of the operating system of the main system according to the detection of timeout of the first timer, and
    the device driver of the main system operates according to the DMA transfer completion interruption request and cancels the first timer upon completion of the audio mixing processing.

4. The multi-core system according to claim 1, wherein
    upon reception of the DMA transfer completion interruption request, the driver management unit sets a second timer to monitor a DMA transfer start time of the audio data to detect a failure of the operating system of the main system according to the detection of timeout of the second timer; and
    the device driver of the main system operates according to the DMA transfer completion interruption request and cancels the second timer upon completion of the DMA transfer request processing.

5. The multi-core system according to claim 1, wherein
    upon detection of a failure of the operating system of the main system, the device driver of the standby system performs processing to guarantee integrity of stream data of the audio data around the time of the detection of the failure concerning the audio mixing processing.

6. The multi-core system according to claim 5, wherein
    upon detection of a failure of the operating system of the main system, the device driver of the standby system starts processing for outputting audio data stored in the shared memory based on the value of the parameter before the failure is detected using a parameter to count the number of times that audio data is transferred by DMA from the shared memory to the peripheral device, to perform processing for mixing the audio data that is processed.

7. The multi-core system according to claim 5, wherein
    upon detection of a failure of the operating system of the main system, the device driver of the standby system temporarily sets a base address of the peripheral device on the shared memory referred to by an operation system of the operating system in which the failure is detected as an invalid address.

8. A method of controlling a multi-core system comprising a plurality of processors, a plurality of operating systems operated on the plurality of processors, a shared memory shared by the plurality of operating systems, and a peripheral device shared by the plurality of operating systems and receiving audio data stored in the shared memory, the audio data being transferred by DMA, the plurality of operating systems being set as a main system and a standby system for a sound reproducing function, wherein:
    a driver management unit included in the operating system of the standby system or operating on the operating system of the standby system sets a timer according to a DMA transfer completion interruption request to detect a failure in the operating system of the main system according to detection of timeout by the timer, upon detection of the failure in the operating system of the main system, switches the operating system of the standby system as the operating system of the main system, and operates a device driver of the standby system managed by the driver management unit, the device driver being included in the operating system of the standby system or operating on the operating system of the standby system, thereby continuously executing audio mixing processing of audio data and DMA transfer request processing.

9. The method of controlling the multi-core system according to claim 8, wherein
upon detection of a failure of the operating system of the main system, the device driver of the standby system performs processing to guarantee integrity of stream data of the audio data around the time of the detection of the failure concerning the audio mixing processing.

10. A multiprocessor including a plurality of operating systems set as a main system and a standby system for a sound reproducing function, comprising:
a plurality of operating systems respectively operated on the plurality of processors;
a DMA controller for controlling DMA transfer of audio data stored in an external shared memory from the external shared memory shared by the plurality of operating systems to a peripheral device;
a driver management unit included in the operating system of the standby system or operating on the operating system of the standby system; and
a device driver of the standby system included in the operating system of the standby system or operating on the operating system of the standby system, the device driver being managed by the driver management unit, wherein
the driver management unit sets a timer according to a DMA transfer completion interruption request to detect a failure of the operating system of the main system according to detection of timeout by the timer, and
upon detection of the failure of the operating system of the main system, the driver management unit switches the operating system of the standby system as the operating system of the main system, operates the device driver of the standby system, to continuously execute audio mixing processing of audio data and DMA transfer request processing.

* * * * *